(12) United States Patent
Myllykangas et al.

(10) Patent No.: US 12,466,599 B2
(45) Date of Patent: Nov. 11, 2025

(54) FAST CHANGEOVER CARTONER

(71) Applicant: Graniten Engineering AB, Uddevalla (SE)

(72) Inventors: Fredrik Myllykangas, Uddevalla (SE); Daniel Brännwik, Uddevalla (SE); Lars Krewer, Uddevalla (SE)

(73) Assignee: Graniten Engineering AB, Uddevalla (SE)

( * ) Notice: Subject to any disclaimer, the term of this patent is extended or adjusted under 35 U.S.C. 154(b) by 852 days.

(21) Appl. No.: 17/596,451

(22) PCT Filed: Jun. 11, 2020

(86) PCT No.: PCT/SE2020/050604
§ 371 (c)(1),
(2) Date: Dec. 10, 2021

(87) PCT Pub. No.: WO2020/251465
PCT Pub. Date: Dec. 17, 2020

(65) Prior Publication Data
US 2022/0306331 A1    Sep. 29, 2022

(30) Foreign Application Priority Data
Jun. 12, 2019  (SE) .................................... 1950697-1

(51) Int. Cl.
*B65B 59/00* (2006.01)
*B65B 43/16* (2006.01)
(Continued)

(52) U.S. Cl.
CPC .......... *B65B 59/003* (2019.05); *B65B 43/165* (2013.01); *B65B 43/52* (2013.01);
(Continued)

(58) Field of Classification Search
None
See application file for complete search history.

(56) References Cited

U.S. PATENT DOCUMENTS

| 1,434,230 A | 10/1922 | Donald et al. |
| 4,135,439 A | 1/1979 | Murrah |

(Continued)

FOREIGN PATENT DOCUMENTS

| GB | 916886 A | 1/1963 |
| GB | 2561826 A | 10/2018 |
| JP | S5149320 U | 4/1976 |

OTHER PUBLICATIONS

International Search Report (PCT/ISA/210) and Written Opinion (PCT/ISA/237) mailed on Jul. 14, 2020, by the Swedish Patent Office as the International Searching Authority for International Application No. PCT/SE2020/050604.
(Continued)

*Primary Examiner* — Tanzim Imam
(74) *Attorney, Agent, or Firm* — Buchanan Ingersoll & Rooney PC (57) ABSTRACT

A cartoner includes an entrance section, a loading section, an exit section, a transport system and a controller. The entrance section is configured for picking carton blanks from a magazine and folding a first side of the carton. The loading section is configured for loading a product into the first-side-folded carton. The exit section is configured for closing the loaded carton. The transport system is configured for transporting the first-side-folded carton from the entrance section to the loading section and the loaded carton from the loading section to the exit section. The controller is arranged for controlling an operation following each carton through the cartoner. The controller is further arranged for adapting, for each carton, a distance between two consecutive carriers of the transport system in dependence to a size of the
(Continued)

first-side-folded carton and driving the two consecutive carriers maintaining the distance.

8 Claims, 11 Drawing Sheets

(51) Int. Cl.
    *B65B 43/52* (2006.01)
    *B65B 43/54* (2006.01)
    *B65B 49/04* (2006.01)
    *B65B 57/04* (2006.01)
    *B65B 59/02* (2006.01)

(52) U.S. Cl.
    CPC .............. *B65B 43/54* (2013.01); *B65B 49/04* (2013.01); *B65B 57/04* (2013.01); *B65B 59/005* (2013.01); *B65B 59/02* (2013.01); *B65B 2210/04* (2013.01); *B65B 2220/02* (2013.01)

(56) References Cited

U.S. PATENT DOCUMENTS

| | | | |
|---|---|---|---|
| 4,718,540 A * | 1/1988 | Greenwell | B65G 23/26 198/803.11 |
| 5,115,625 A | 5/1992 | Barbulosco et al. | |
| 5,321,936 A | 6/1994 | Sendldorfer | |
| 7,735,296 B2 | 6/2010 | Momich | |
| 2008/0127618 A1 | 6/2008 | Monti | |
| 2008/0182741 A1 | 7/2008 | Hunter et al. | |
| 2015/0143777 A1* | 5/2015 | Rapp | B65B 43/52 53/381.1 |
| 2017/0247129 A1 | 8/2017 | Menta et al. | |
| 2018/0222608 A1 | 8/2018 | Hutter et al. | |

OTHER PUBLICATIONS

Swedish Search Report in corresponding Application No. 2150569.8 dated Jun. 12, 2019.

Beckhoff Automation: "XTX. The Linear Transport System from Beckhoff." https://www.youtube.com/watch?v=Rh8HfCHlyNc.

* cited by examiner

FAST CHANGEOVER CARTONER

TECHNICAL FIELD

The here presented technology relates in general to packing devices and methods and in particular to cartoners and methods for cartoning.

BACKGROUND

Most products of today are packaged in some way before they are distributed and sold. Typically, there is an inner package, also called primary package, such as a bottle, a vacuum polymer film, or a blister package. These inner packages often serve the purpose to ensure the hygienic conditions, tamper protection or the like. In many cases, these inner packages are then loaded into outer packages also called secondary packages, typically different kinds of cartons. These cartons typically serve the purpose of enclosing one or several inner packages, facilitate ease of handling and/or providing additional protections against transport damages. The cartons often include batch information, tamper evidence and a user instruction for the primary package.

For products manufactured in very large quantities, specialized automatic cartoning lines can be built, in which the equipment is particularly adapted to the type of inner package and the size and type of carton. For products produced in quantities that do not occupy a cartoning line in full, such specialized lines are typically too expensive and inflexible to use. Manual loading can then be used, or flexible cartoning lines, having possibilities to be adapted e.g. to different carton sizes can be utilized. In many industries, e.g. pharmaceutical industries or food industries, human activities during the packaging are to be avoided due to hygienic reasons.

A problem with flexible packaging lines is that there is typically a need for extensive changeover actions when changing from one type of package to another. Magazines sizes, transport carriers, folding devices etc. have to be adapted, typically by mechanical readjustments. Such changeover activities need labor resources and they also cause the equipment to be unutilized during the changeover time. Such aspects considerably increase the costs for packaging of medium and small batches of products.

SUMMARY

A general object is to provide devices and methods enabling a fast changeover cartoner.

The above object is achieved by methods and devices according to the independent claims. Preferred embodiments are defined in dependent claims.

In general words, in a first aspect, a cartoner comprises an entrance section, a loading section, an exit section a transport system and a controller. The transport system connects the entrance section and the loading section, and the loading section and the exit section, respectively. The entrance section is configured for picking carton blanks from a magazine and folding a first side of the carton. The loading section is configured for loading a product into the first-side-folded carton. The exit section is configured for closing a second side of the loaded carton, opposite to the first side. The transport system is configured for transporting the first-side-folded carton from the entrance section to the loading section and the loaded carton from the loading section to the exit section. The transport system comprising a rail and carriers running along the rail. The controller is arranged for controlling an operation of the entrance section, the loading section, the exit section and the transport system following each carton through the cartoner. The controller is further arranged for adapting, for each carton, a distance between two consecutive carriers of the transport system in dependence to a size of the first-side-folded carton and driving the two consecutive carriers along the rail maintaining the distance. The controller is further arranged to control the entrance section and/or the loading section to place the first-side-folded carton and/or the loaded carton, respectively, between the two consecutive carriers.

One advantage with the proposed technology is that a fast changeover between different carton types is enabled. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the present disclosure, a "cartoner" is an arrangement or apparatus for folding a carton and filling it with some items. Likewise, a method for cartoning is to be understood the procedures for folding a carton and filling it with some items.

For a better understanding of the proposed technology, it may be useful to begin with the description of a few general aspects. In an efficient cartoner, different sections are provided, e.g. an entrance section, a loading section and an exit section. The entrance section may provide equipment for picking carton blanks from a magazine and folding a first short side of the carton. The loading section may provide equipment for loading a product into the carton that has the first short side folded. The loading section may optionally allow also other actions, such as loading of user instructions. The exit section may provide equipment for closing a second side of the loaded carton. The exit section may optionally allow also other actions, such as marking of the carton, e.g. provision of batch information, or provision of tamper protections. Each section can be composed by one or more modules, where each module may be designed for a particular task. Between these sections, the cartons are transported by some kind of transport system.

In prior art, the different sections, and even modules within the same section, are basically operating independently of each other. When the entrance section has finished its operations and has put the carton on the transport system to the loading section, there is no further connection with the subsequent activities. Analogously, when the loading section receives the folded carton, it does not know anything about the previous handling of the particular carton, since all cartons are intended to be treated in the same manner. Since there is no general communication between the different sections, the entire system has to be adjusted to a certain carton and product. For instance, preferably, the rate of handling cartons in each section has to be adapted so that there is no build-up of waiting cartons, or section inactivity periods due to lack of available cartons.

One basic idea for enabling a fast changeover is thus to treat each carton as an individual object. Adjustments, settings etc. of each section should be adapted to the carton that presently is processed. This means that the entrance section could treat a carton of one type simultaneously as the loading section treats a carton of another type. The instructions for operating each section should therefore "follow" each carton individually. In other words, the operation of a section should depend on the type of carton that is under treatment, independently of what concurrently is performed in the other sections.

In order to achieve such flexibility, it is necessary to manage all adaptations of the section operations without any manual interference. This could be achieved by giving each section its own detection system for identifying different cartons. However, this approach is believed to be complex and expensive. In a more efficient approach, a controller, communicating with all sections, can be used. Such a controller can keep track on which types of cartons that are entered into the system and how they move through the different sections. In other words, the controller is arranged for controlling an operation of the entrance section, the loading section, the exit section and any transport system, following each carton through the cartoner.

Another requisite for enabling fast changeover is the availability of carton blanks of different sizes. If a single magazine is to be used, the different carton blanks have to be placed in a well specified order in the magazine and the magazine has to be compatible with sizes and shapes of all used carton blanks. Such an approach is thus less likely to be useful.

Instead, the entrance section comprises a plurality of magazines for carton blanks. The magazines are each one typically adapted for a single size and shape of the carton blanks, but may differ from each other. Multiple magazines opens up for changing instantaneously between different cartons. Different cartons are then available simultaneously in the entrance section and the controller can select which ones to be used from one cartoon to the next. The controller is thereby arranged for controlling the entrance section, for each carton, to pick the carton blank from a particular one of the plurality of magazines.

Multiple magazines may also assist in avoiding unnecessary stops during an operation phase of a single carton type due to loading of a new pile of carton blanks. By entering a new magazine of a same carton blanks type before the previous pile of carton blanks is finished, the operation can be continuous without stop for unloading and loading of magazines.

The operation of the entrance section can be different for different selections of cartons. For example, different folding tools or folding operations can be used depending on the selected carton. However, if the cartons are of similar types, common tools and/or operations may be used. Examples will be discussed further below.

When a carton is folded at a first short side, it is typically to be provided to the loading section. This is typically performed by a first part of a transport system. In order to provide a safe and well defined transport of the carton, some arrangements for defining the position of the carton in relation to the transport system are to be provided.

Many prior art transport systems are based on a rail, and carriers that are moved along the rail. The carriers are typically provided with some kind of geometrical shape or gripping arrangement, into which a product to be transported is provided. The carriers are then typically controllable in their motion along the rail, enabling stops when loading, unloading and queuing is to be performed, and displacements with suitable speed during the actual transports. This is easily achieved in systems having a single size and shape for the transported products.

However, in the present case, the demands on the transport system is that it should be adaptable for different sizes and/or shapes of the transported items, and furthermore on an item-to-item basis. One approach for achieving a flexible use would be to introduce gripping arrangements on the carriers that are individually controllable. However, since the carriers are moving, communication with the individual carriers for controlling individual parts thereof is not a simple task and certainly not inexpensive.

In the technology presented here, in one embodiment, the controllability of the carriers along the rail is used in carrier pairs. A certain distance between two consecutive carriers of the transport system can be set by moving one or both of the carriers in the pair. By adapting this distance to be in agreement with e.g. a width of a carton to be transported, a carton of this width can safely be placed between the carriers. By then moving the pair of carriers along the rail with the relative distance maintained, a safe transportation of the carton can be assured, all controlled by the controller.

In other words, the controller is arranged for adapting, for each carton, a distance between two consecutive carriers of the transport system in dependence to a size of the first-side-folded carton and for driving the two consecutive carriers along the rail maintaining the distance. The controller is then also arranged to control the entrance section to place the first-side-folded carton between said two consecutive carriers and/or to control the loading section to place the loaded carton between the two consecutive carriers.

An embodiment will be described below, illustrating these general ideas as well as different preferred detail embodiments.

Figure 1:
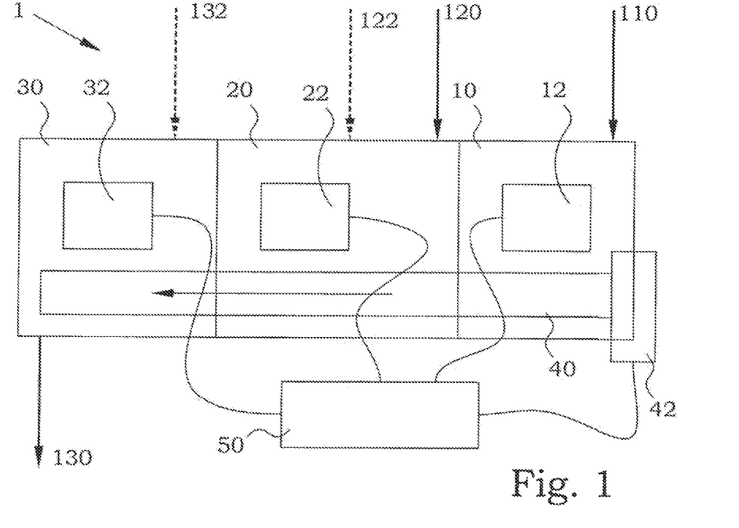
FIG. 1 illustrates schematically an embodiment of a cartoner.

FIG. 1 illustrates schematically an embodiment of a cartoner 1. The cartoner comprises an entrance section 10, a loading section 20 and an exit section 30. A transport system 40 connects entrance section 10 and the loading section 20, and also the loading section 20 and the exit section 30, respectively.

The entrance section 10 is typically provided with magazines holding piles of carton blanks 110. The entrance section 10 is configured for picking carton blanks 110 from the magazine. This is performed by a manipulator system 12, typically a robot. The manipulator system 12 is arranged for folding a first side of the carton. The one-side-folded carton is moved from the entrance section 10 to the loading section 20 by means of the transport system 40, controlled by a transport controller 42.

The loading section 20 is configured for loading a product 120 into the first-side-folded carton. The products 120 are provided into the loading section 20 and placed at a position from which a manipulator system 22, typically a robot, can pick it up. The actual loading may be performed when the first-side-folded carton still is placed in the transport system 40. Alternatively, the first-side-folded carton may first be moved from the transport system 40 to a loading position by means of the manipulator system 22. The loading can then take place at this loading position and finally, the loaded carton can be returned to the transport system 40. Optionally, additional material 122 can also be loaded into the carton, such as e.g. leaflets or chock damping means. The loaded carton is moved from the loading section 20 to the exit section 30 by means of the transport system 40, controlled by the transport controller 42.

The details of the loading section depends heavily on the actual nature of the product to be loaded. The technology for achieving such loading is, as such, well known in this field of technology, and has no crucial impact of the present novel ideas. Therefore, the details of the loading section 20 are assumed to be configured according to well-known technology and is therefore not discussed in detail.

The exit section 30 is configured for closing a second side of the loaded carton. The second side is opposite to the first side. In analogy with the other sections, the exit section 30 comprises a manipulator system 32, typically a robot. The manipulator system 32 picks the loaded carton from the transport system 40 and closes the second side of the loaded carton. Optionally, outer features of the carton can be provided, e.g. labels, printing, tampering proof in the exit section. Material 132 for such outer features are provided to the exit section 30. The manipulator system 32 finally places the packed carton 130 in a position from which it can be further transported.

The transport system 40 is in other words configured for transporting the first-side-folded carton from the entrance section 10 to the loading section 20 and the loaded carton from the loading section 20 to the exit section 30. This is typically controlled by the transport controller 42. The transport system, as will be discussed more in detail below, comprises a rail and carriers running along the rail.

The cartoner 1 also comprises a controller 50. The controller is arranged for controlling an operation of the entrance section 10, the loading section 20, the exit section 30 and the transport system 40, following each carton through the cartoner. The controller is further arranged for adapting, for each carton, a distance between two consecutive carriers of the transport system in dependence to a size of the first-side-folded carton. The controller is further arranged for driving the two consecutive carriers along the rail maintaining the distance. The controller is further arranged to control the entrance section 10 and/or the loading section 20 to place the first-side-folded carton and/or said loaded carton, respectively, between the two consecutive carriers. This will be discussed more in detail below.

Figure 2:
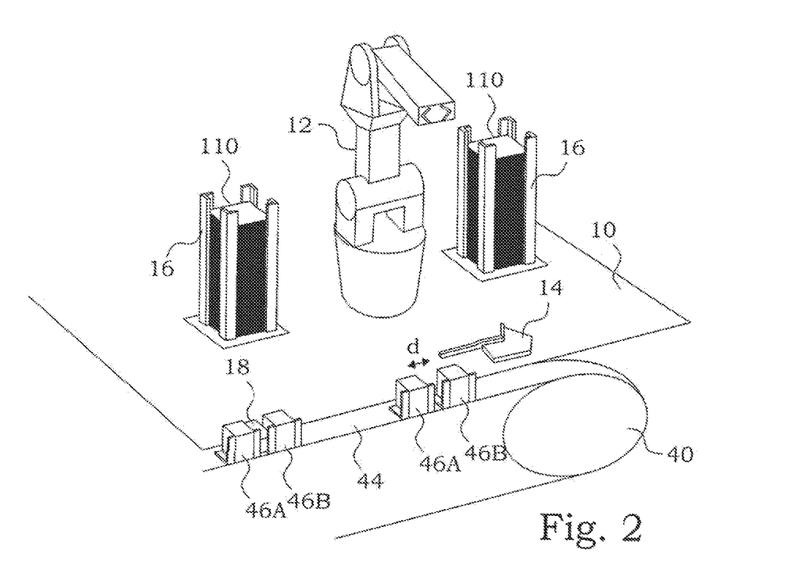
FIG. 2 illustrates schematically an embodiment of an entrance section.

FIG. 2 illustrates schematically an embodiment of an entrance section 10. A plurality, of which two are drawn, of magazines 16 holding carton blanks 110 are provided within reaching distances of the manipulator system 12, in this embodiment an entrance robot. The magazines are provided at defined positions. When a new carton, typically having an assigned carton ID number, is to be folded and loaded, the manipulator system 12 is informed by the controller about the intended features of the carton and load. A carton type identification is typically provided, which is associated with dimensions of the carton and the position of the magazine holding the carton blanks. Either, all this information can be transferred from the controller to the manipulator system 12. As an alternative, a carton type ID can be transferred, informing the manipulator system 12 how to retrieve necessary information from a data storage, in which the actual carton dimensions and magazine positions are pre-stored.

Based on the carton type identification data, the manipulator picks up the appropriate carton blank from the intended magazine. In this embodiment, the manipulator system 12 moves the carton blank in a predetermined path relative to a folding tool 14, causing a first side of the carton to be folded. This particular folding tool 14 is only very schematically drawn in this Figure, but a preferred embodiment will be discussed more in detail further below.

In other words, the entrance section 10 comprises a plurality of magazines 16 for carton blanks 110. The controller is arranged for controlling the manipulator system 12 of the entrance section 10, for each individual carton, to pick the carton blank 110 from a particular one of the plurality of magazines 16.

When the manipulator system 12 is informed about the carton type identification for a carton ID number, the transport system 40 is also informed about the carton type identification, in particular the carton size. The transport system 40 thereby assigns two carriers 46A and 46B to this carton ID number and instructs the carriers 46A and 46B to move coordinated along a rail 44 with a constant distance d there between. This distance d is adapted to correspond to the carton size of that particular carton ID number. The carriers 46A and 46B assigned to the present carton ID number are placed in a carton loading position.

When the manipulator system 12 has finished the folding of the first side, the controller is arranged to control the manipulator system 12 entrance section 10 to place the first-side-folded carton 18 between the two consecutive carriers 46A and 46B. The transport system 40 is notified about that the first-side-folded carton 18 is in place and transports the two carriers 46A and 46B to the loading section.

Figure 3:
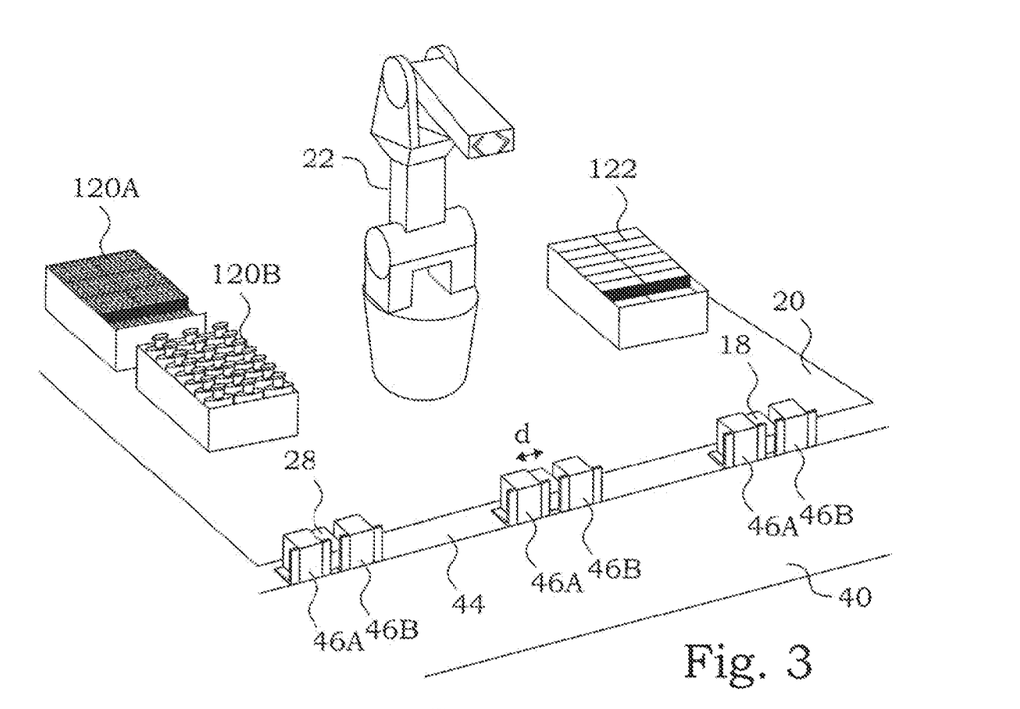
FIG. 3 illustrates schematically an embodiment of a loading section.

FIG. 3 illustrates schematically an embodiment of a loading section 20. Different kinds of products 120A and 120B are provided within reaching distance of a manipulator system 22, in this embodiment a robot. When two carriers 46A and 46B with a first-side-folded carton 18 is provided in a predetermined loading position, the manipulator system 22 is informed about the properties of that particular carton ID number. Typically, the manipulator system 22 is informed about the content intended to be loaded into the carton. Typically, the manipulator system 22 receives or retrieves information about the type of product, size and position of the primary package. Additional material 122, such as leaflets or shock damping material could also be instructed to be loaded, depending on the particular carton ID number.

The actual loading is performed according to, as such, well-known procedures by the manipulator system 22.

In other words, the controller is arranged for controlling the loading section 20 to load appropriate content 120A, 120B adapted to the carton size of each individual carton.

The loading may in some embodiments be performed directly at the transport system rail 44, while the first-side-folded carton 18 is held by the two carriers 46A and 46B. A loaded carton 28 is thereby provided.

Alternatively, the manipulator system 22 may pick the first-side-folded carton 18 from the transport system 40 and place it in a particular loading location, at which the actual loading takes place. Thereafter, the loaded carton 18 is again placed between the two carriers 46A and 46B. In other words, the controller is in such an embodiment configured to control the manipulator system 22 of loading section 20 to place the loaded carton 18 between the two consecutive carriers 46A and 46B.

Figure 4:
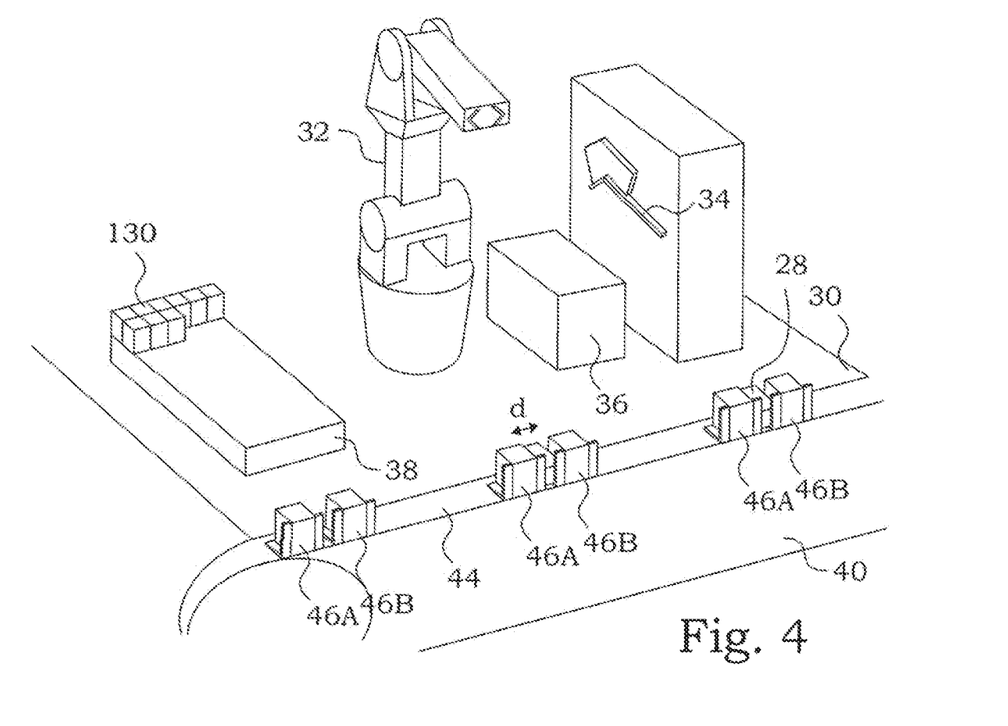
FIG. 4 illustrates schematically an embodiment of an exit section.

FIG. 4 illustrates schematically an embodiment of an exit section 30. When two carriers 46A and 46B with a loaded carton 28 is provided in a predetermined exiting position, a manipulator system 32, in this embodiment a robot, is informed about the properties of that particular carton ID number. Typically, the manipulator system 32 is informed about the size of the carton and if there are any type of intended post-treatment. Typically, the manipulator system 32 receives or retrieves information about the size of the carton in order to enable a pick-up of the loaded carton 28 from the two carriers 46A and 46B. The manipulator system 32 of the exit section 30 cooperates or comprises in this particular embodiment a carton sealing tool 34 capable of sealing a multitude of carton sizes. In this way, the top, or second side, of the carton is folded. The carton sealing tool 34 may be the same as the carton sealing tool 14 of the entrance section 10.

The exit section 30 may also comprise additional tools 36 or equipment for treating the folded carton. Non-exclusive examples of additional tools 36 influencing the outer surfaces or appearance of the carton could e.g. different types of printing, labeling or tamper-securing devices. For instance, the carton can be provided by batch numbers, packing date and time or content lists. All such information necessary to perform such post-treatment can be supplied individually for each carton by the controller.

After post-treatment, if any, the loaded and folded carton 130 is placed on a pallet 38 or in an outer box for further processing and/or transport.

The two carriers 46A and 46B are now free to be moved back to the entrance section for being associated with a new carton.

Figure 5:
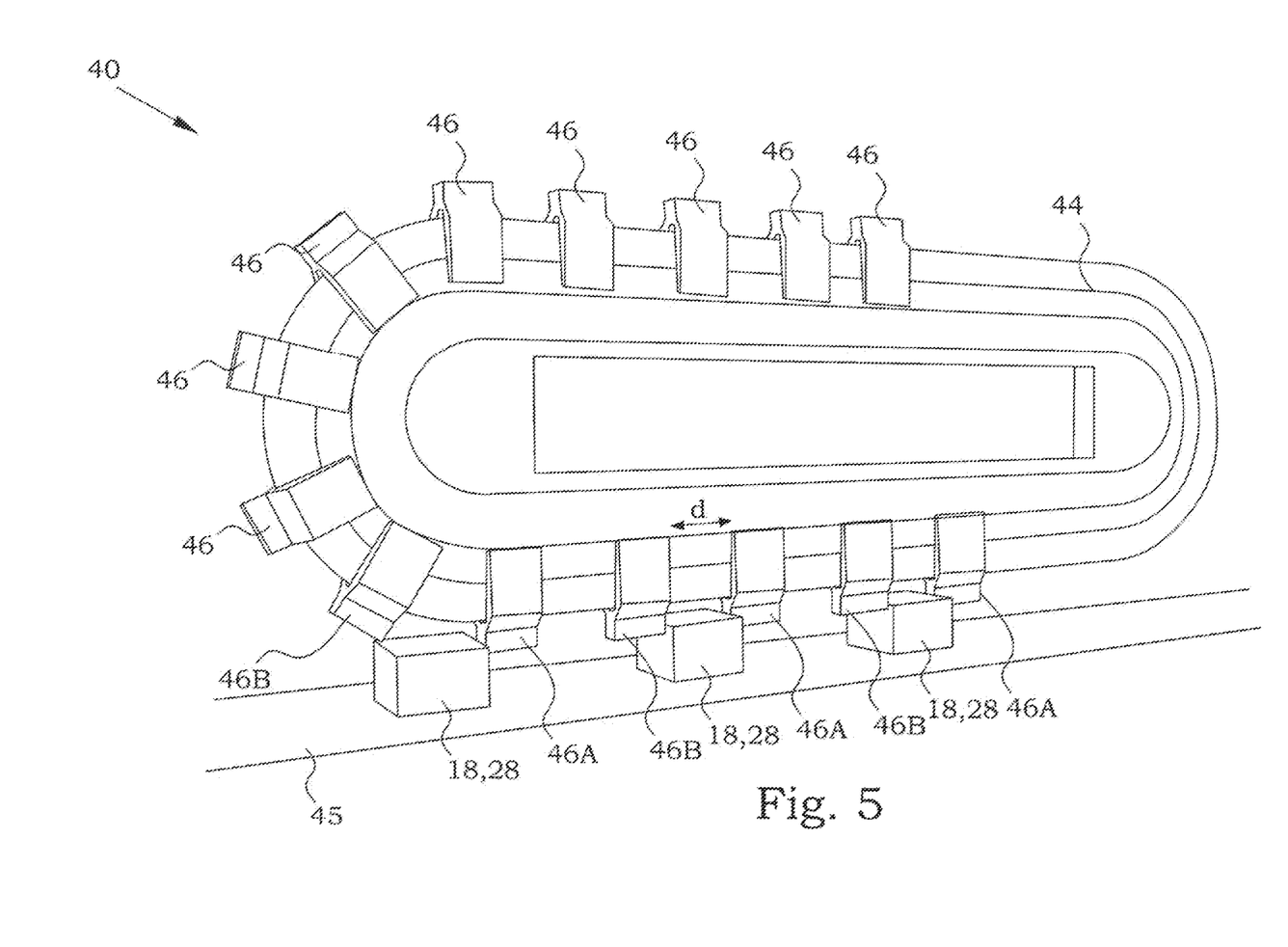
FIG. 5 illustrates one embodiment of a transport system.

FIG. 5 illustrates one embodiment of a transport system 40 that can be used in connection with the above presented technology. The transport system 40 in this embodiment comprises a rail 44 shaped as a race track. Along the rail 44, carriers 46, 46A, 46B, also referred to as movers, are movable in a programmable manner. In this embodiment, the carriers are associated in pairs 46A, 46B with a particular carton 18, 28 and the pairs are moved together in the lower part of the race track with a certain distance d between them. This distance d can be different for different pairs of carriers 46A, 46B, depending on the size of the carton it is supposed to transport. A slide surface 45 is provided below the rail 44. Cartons, either one-side folded cartons 18 or loaded cartons 28 are placed by the manipulator systems of the respective section between the pairs of carriers 46A, 46B associated with that particular carton. The carton 18, 28 is thereby captured between the pairs of carriers 46A, 46B. When the pairs of carriers 46A, 46B thereafter is moved along the race, keeping the relative position constant, the carton 18, 28 is transported, sliding on the slide surface 45. Since the relative distance between the pairs of carriers 46A, 46B is programmable for each individual pair, the size of the transported carton can be varied from one carton to the next.

The carriers and the transport system can be designed in many different geometrical configurations. In FIGS. 2-4, it was indicated that the main transport system 40 was positioned below the path along which the cartons 18, 28 are transported, and the cartons 18, 28 were supported by the carriers 46A-B. In FIG. 5, the main transport system 40 was instead positioned above the path along which the cartons 18, 28 are transported, and the cartons 18, 28 were supported by the slide surface 45. The carriers 46A-B here only supplied the moving action.

Figure 6A:
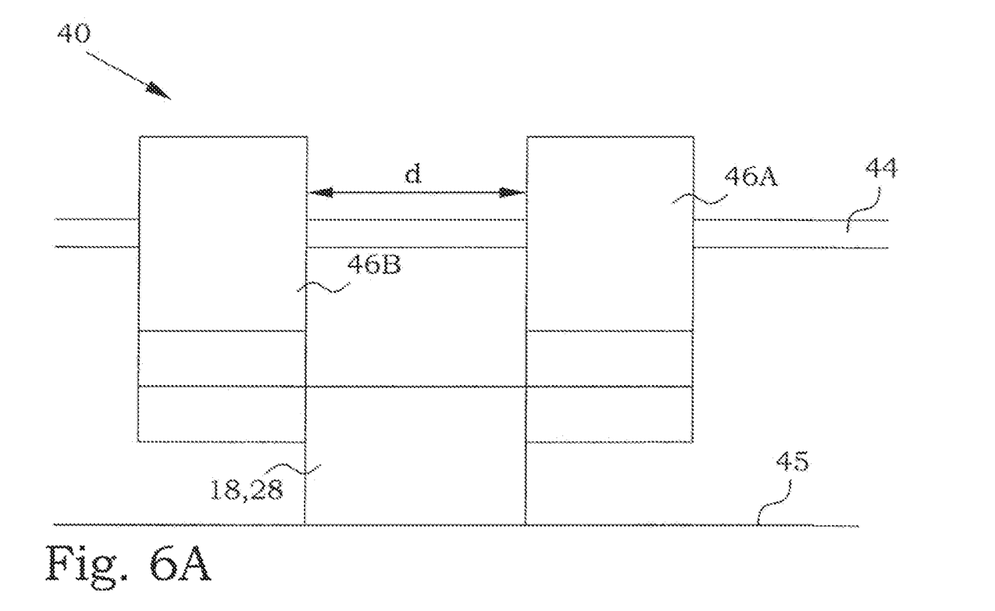
FIG. 6A illustrates an embodiment of a pair of carriers.

FIG. 6A illustrates a similar setup is illustrated in a side view. Two carriers 46A and 46B are movable along a rail 44 with a separation distance d. A carton 18, 28 of width d can thereby be captured and be forced to follow the motion of the carriers, sliding at the slide surface 45. The plane of the rail 44 loop may be provided in any direction, vertical as well as horizontal, depending on the design of the entire arrangement.

Figure 6B:
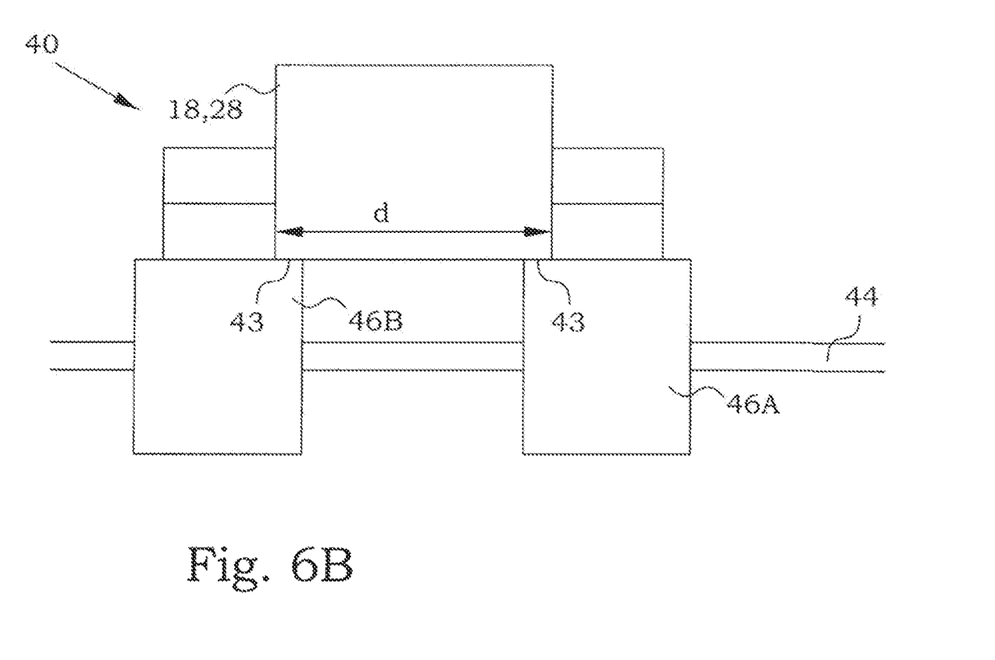
FIG. 6B illustrates another embodiment of a pair of carriers.

FIG. 6B illustrates another embodiment of a transport system 40 in a side view. Here the carriers 46A and 46B are provided on the rail 44 below the cartons 18, 28 to be transported. The distance d is here adapted in such a way that the edges of the carton is supported by upwards direction support surfaces 43 of the carriers 46A and 46B. In such a design, the carriers 46A and 46B have to be capable of carrying the weight of the carton 18, 28 as well as of the loaded product therein, if any. Also here, the plane of the rail 44 loop may be provided in any direction, vertical as well as horizontal, depending on the design of the entire arrangement.

Figure 6C:
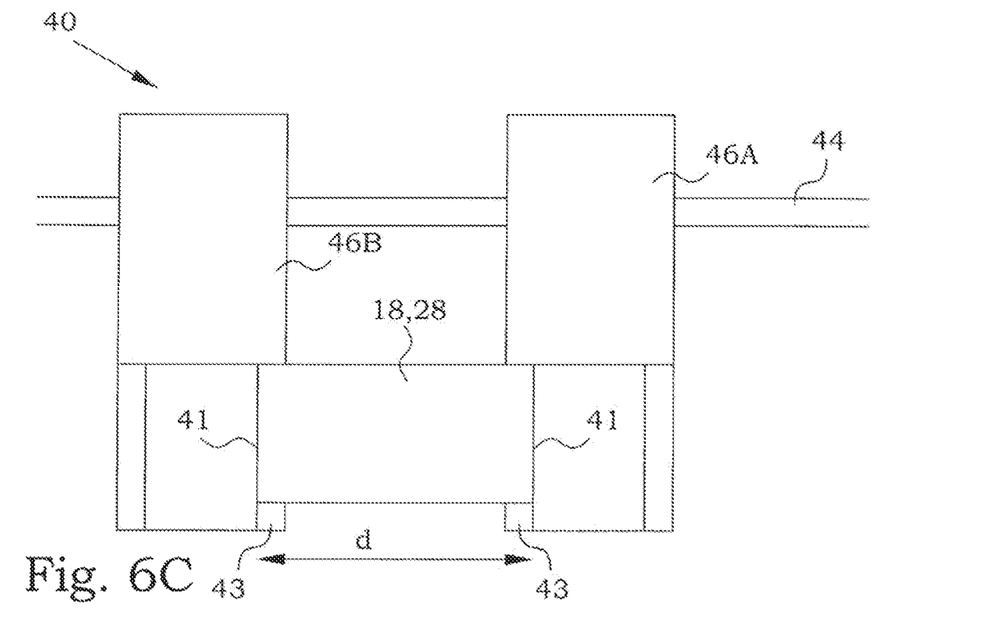
FIG. 6C illustrates yet another embodiment of a pair of carriers.
Figure 6D:
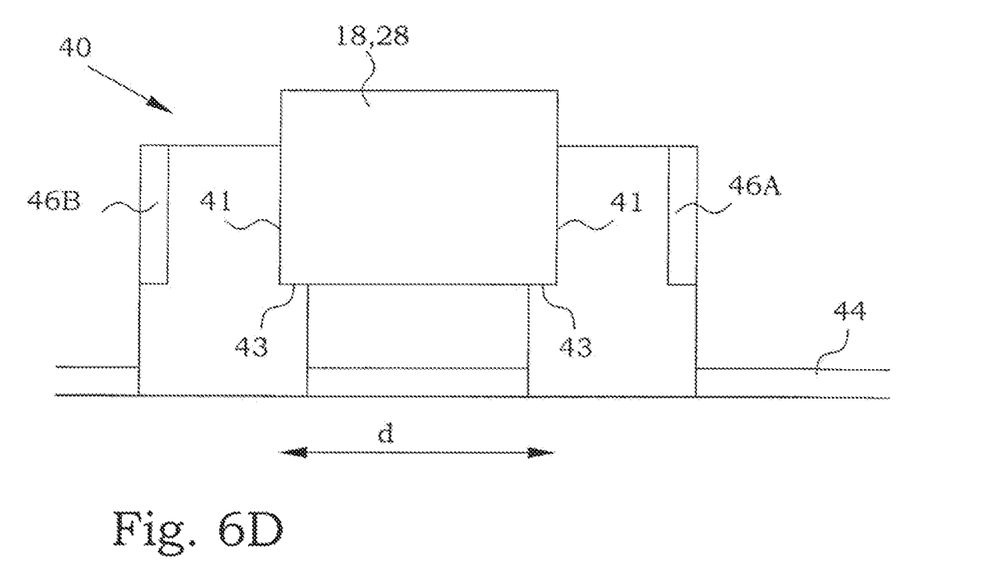
FIG. 6D illustrates another view of the embodiment of the pair of carriers of FIG. 6C.

FIG. 6C illustrates yet another embodiment of a transport system 40 in a top view. In this embodiment, the rail 44 is provided at the side with respect of the transport path of the cartons 18, 28. Also here, the carriers 46A and 46B are provided with supporting surfaces 43 carrying the cartons 18, 28. The distance d is therefore adapted so that the distance between the vertical surfaces 41 above the supporting surface for receiving the width of the cartons 18, 28. FIG. 6D is a side view of the same embodiment. Also here, the plane of the rail 44 loop may be provided in any direction, vertical as well as horizontal, depending on the design of the entire arrangement.

Figure 7A:
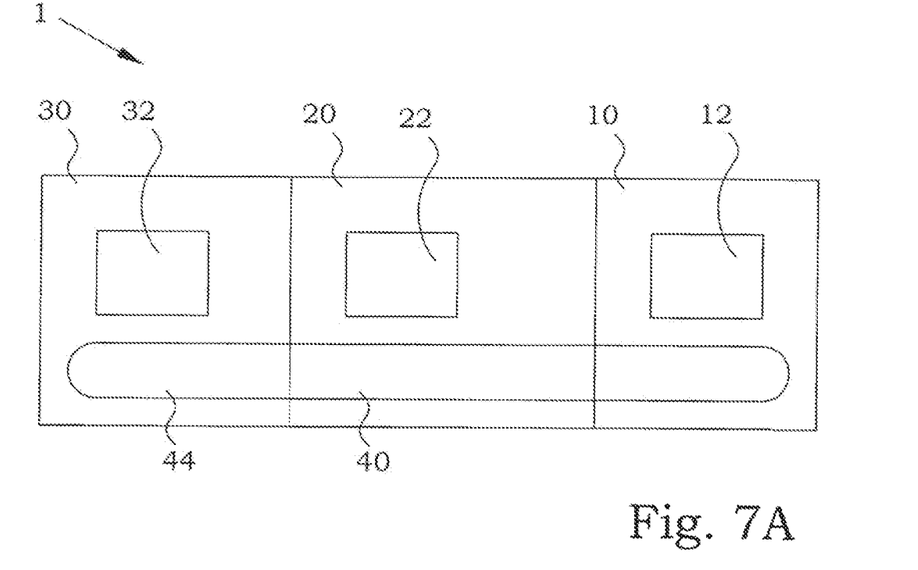
FIG. 7A illustrates one embodiment of a transport system with one common rail.

As illustrated in FIG. 7A, in one embodiment, the transport system 40 comprises one common rail 44 for carton transport both between the entrance section 10 and the loading section 20 and between the loading section 20 and the exit section 30.

Figure 7B:
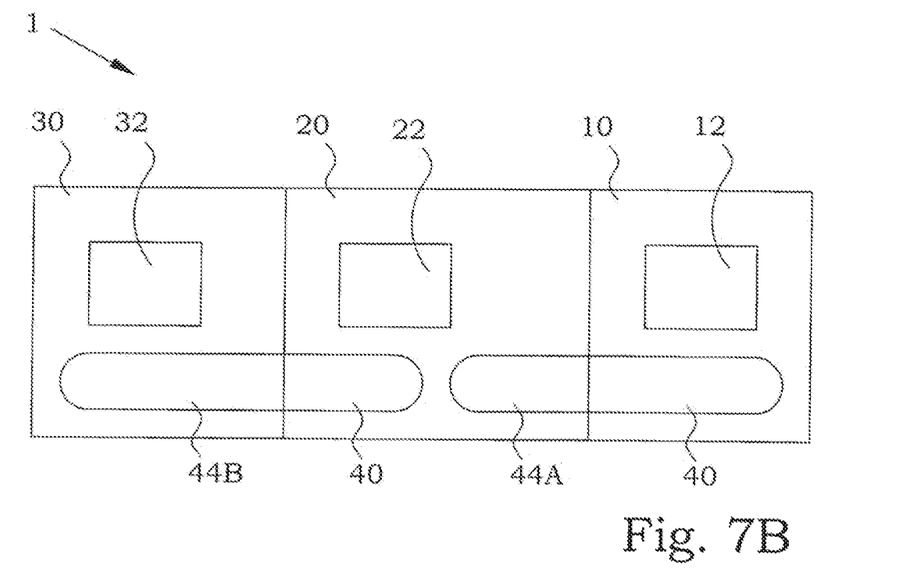
FIG. 7B illustrates one embodiment of a transport system with separated rails.

As illustrated in FIG. 7B, in another embodiment, the transport system 40 comprises one rail 44A for carton transport between the entrance section 10 and the loading section and another rail 44B for carton transport between the loading section and the exit section. There is thus a re-loading of the cartons in the loading section 20. This may be convenient if the loading section 20 is designed for performing the actual loading at a location separate from the transport system 40.

One of the advantages with the here presented technology is that it enables a fast switch between cartons of different types. This is enabled among other things by the common controller having access to carton property data that may be unique for each individual carton.

In a typical example, each carton is assigned a carton ID, typically a running number. Each carton is also typically defined by a carton type ID. Each such carton type ID is predefined to have a certain size. Alternatively, the carton type ID may be exchanged for the size data directly. In some embodiments, the carton type ID may comprise or may be complemented by a position of the magazine of corresponding carton blanks, as was discussed above. Finally, a pair of carriers is assigned to each carton. This data is provided to the manipulator system of the entrance section, either directly or as a link to a data storage from which it can be retrieved.

For the loading section, content data may also be necessary. This content data may be a content ID, associated with pre-defined content data, or may be a direct group of data for each carton. The content data may e.g. comprise a type of primary packing, e.g. a bottle or a blister packing, as well as numbers and sizes of primary packings to be loaded in the carton. The content data may also comprise e.g. positions for the primary packings, batch numbers. Also data concerning additional objects to be loaded, such as information leaflets or shock damping objects may be included. This content data, and preferably also the carton type data is typically provided to the manipulator system of the loading section, either directly or as a link to a data storage from which it can be retrieved.

As mentioned further above, different kinds of post-treatment may be of interest. Therefore the data associated with the carton may also comprise such information. Examples of post-treatments could be different kinds of printings at the cartons or labeling thereof. Batch numbers or production time and date are typical information that may be added on the outside of the carton. Also different tamper-indication arrangements may be added. This post-treatment data, and preferably also the carton type data is typically provided to the manipulator system of the exit section, either directly or as a link to a data storage from which it can be retrieved. Typically, the intended final position, where the carton is intended to be left is communicated to the exit section.

When designing a system that should be able to rapidly switch between cartoning of cartons of different sizes, the entrance and exit sections should be able to handle cartons of different shapes and sizes. In a straightforward solution, a separate dedicated folding tool can be provided for each of the carton types that the system has to switch between. This typically requires space for storing the tools when not used, and since typical robots have restricted areas of operation, this might be a disadvantage, at least if many different sizes are to be covered.

Therefore, in one preferred embodiment, the entrance section and/or the exit section comprises a carton sealing tool 14 that is capable of sealing a multitude of carton sizes.

Furthermore, since a respective manipulator system is available at each section, it would typically be advantageous if the motion possibilities of the manipulator system also could be utilized for achieving the actual folding operation as well. One type of carton sealing tool that would be advantageous to use in this concept is a tool that is predominantly passive, and where the main action is achieved by moving the carton along a predetermined path relative to the carton sealing tool. The carton sealing tool has thus a geometrical shape that folds tabs of the carton. The entrance section and/or the exit section preferably comprises a robot arranged for moving the carton along that predetermined path.

Figure 8:
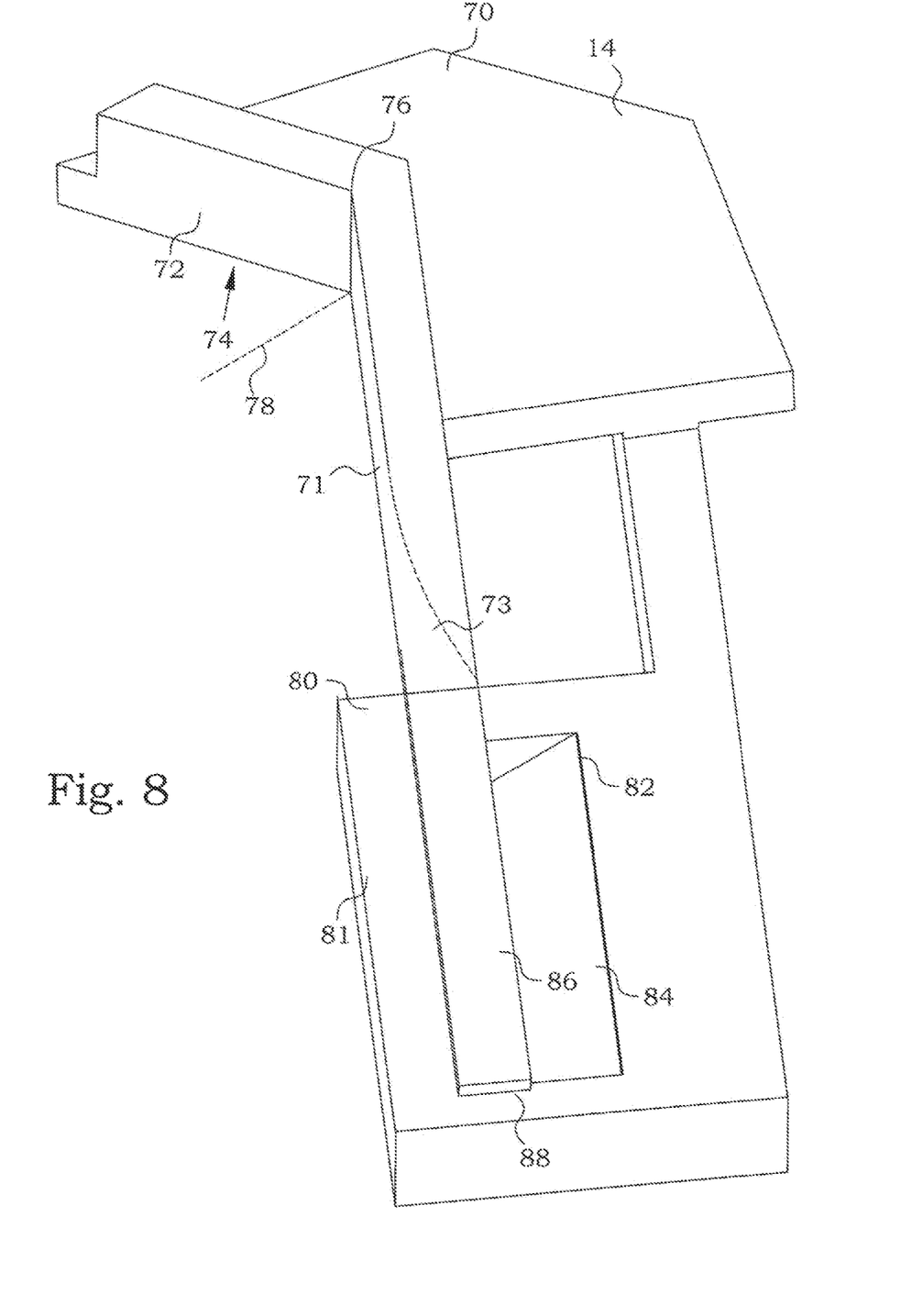
FIG. 8 illustrates an embodiment of a carton sealing tool.

A sealing tool 14 of this kind is schematically illustrated in FIG. 8. The sealing tool 14 of this embodiment is adapted to cartons having two side tabs and at least one closing tab. The sealing tool 14 has a first body part 70, which at one side has a first concavely V-shaped edge 72. Flat edge sides are extending on both sides of a bottom 76 of the concavely V-shaped edge 72. These sides are intended to interact with carton tabs. The first body part 70 has at its bottom a surface 74 that is perpendicular to the concavely V-shaped edge 72. In other words, both the sides of the V-shape are perpendicular to the surface 74 at the bottom.

Figure 9:
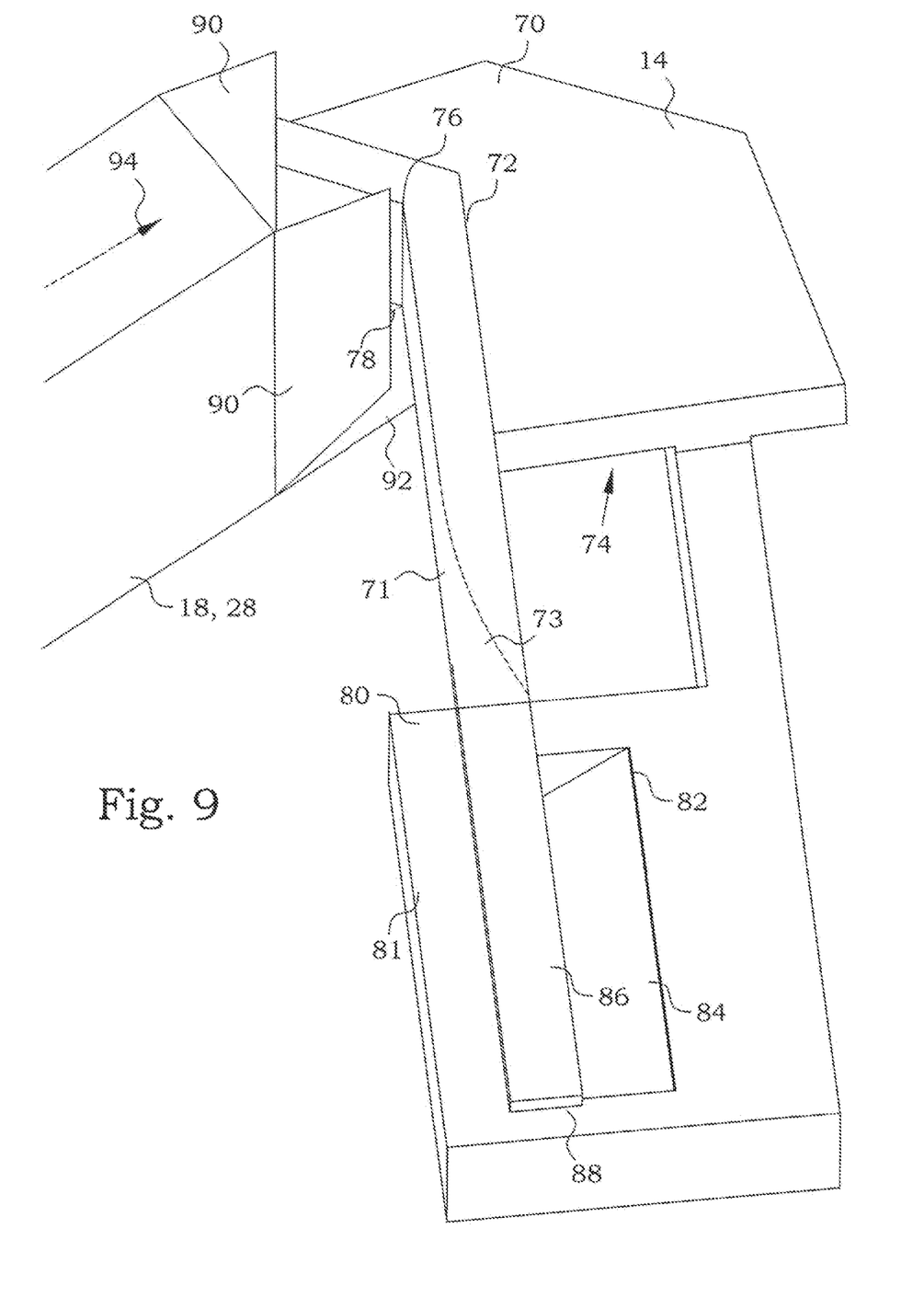
FIG. 9-10 illustrate the embodiment of FIG. 8 when a carton is folded.
Figure 10:
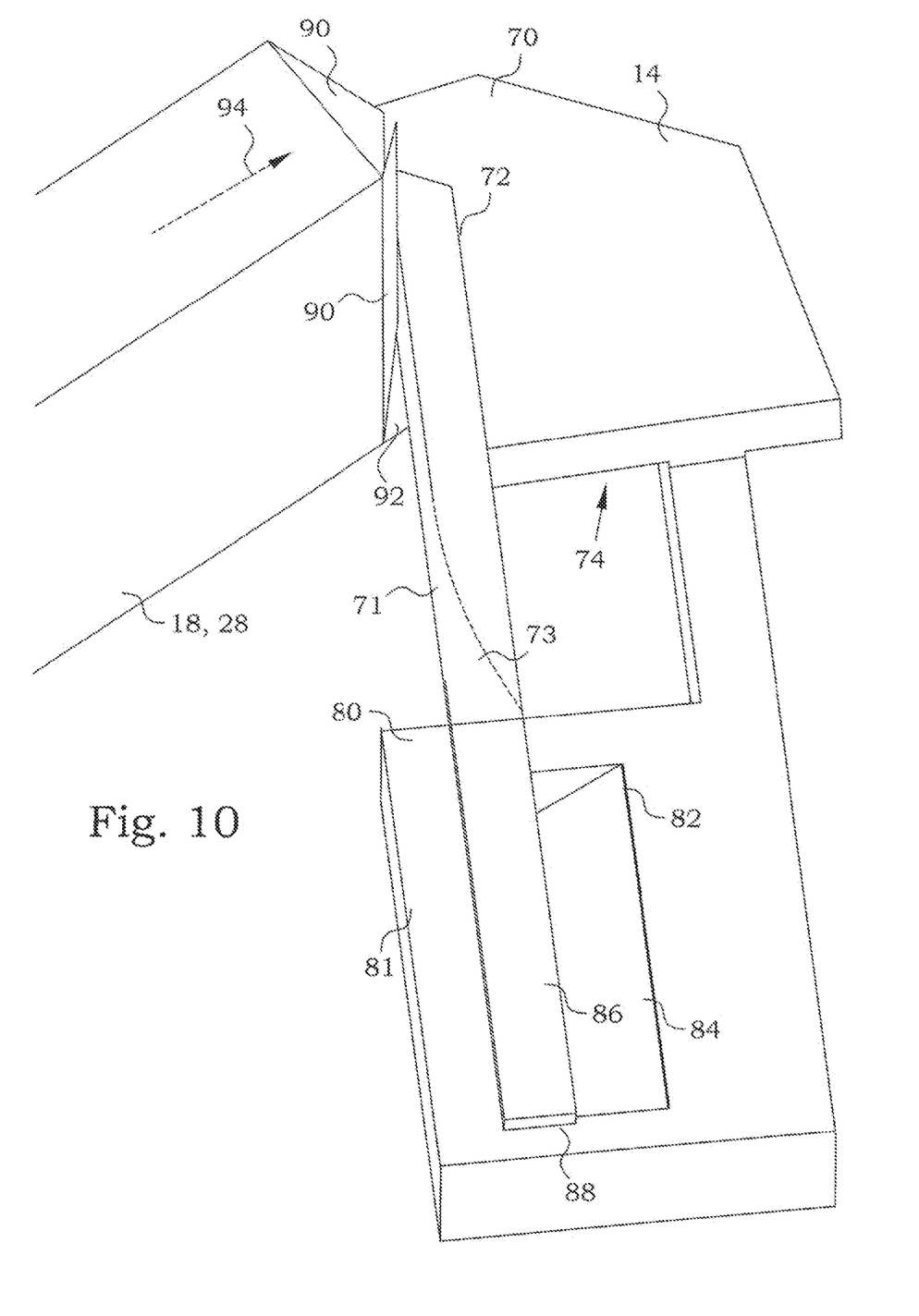

This first body part 70 serves to fold the side tabs of the carton. This is illustrated in FIGS. 9 and 10. A carton 18, 28, when being moved towards the concavely V-shaped edge 72 with the closing tab 92 in a direction 78 along the surface 74 and with side tabs 90 interacting with the concavely V-shaped edge 72 with a center of said carton 18, 28 aligned with a bottom 76 of the concavely V-shaped edge 72, is caused to fold the side tabs 90 inwards. The closing tab 92 is there pushed below the first body part, parallel to the surface 74. The side tabs 90 of the carton 18, 28, reach the surfaces of the concavely V-shaped edge 72 in an angle. This angle causes the side tabs to be folded inwards when the carton 18, 28 continues to move in the direction 78. This action is achieved for different sizes of cartons as long as the side tabs hit the V-shaped edge 72.

The side tabs are not completely folded by this motion, but if the carton then is moved sideward, still parallel to the surface 74, and slightly rotated to have its opening perpendicular to one of the shanks 71 of the V-shaped edge 72, the last part of the folding is completed.

The carton is further moved along the shank 71 towards a second body part 80 such that the closing tab 92 is stuck into a slit 88 between a beam 86 and a table surface 81. At the same time, the opening of the carton is allowed to follow a curved surface 73 of the shank 71, which results in that the closing tab is at least partially folded.

Figure 11:
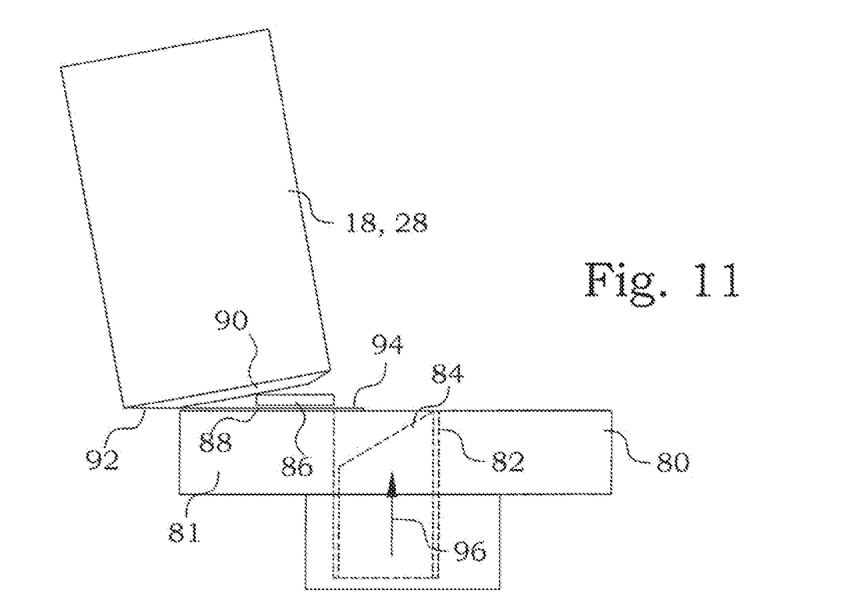
FIG. 11 illustrates the embodiment of FIG. 8 in a side view in one situation during a carton folding.

FIG. 11 illustrates the second body part 80 in a side view. Here it can be seen that the closing tab 92 is positioned between the beam 86 and the table surface 81 in the narrow slit 88. The carton is positioned sideward in order to place the tip part 94 of the closing tab 92 outside the slit 88. In other words, the, in the figure right, edge of the beam 86 can then operate as a folding support for the tip part 94.

The second body part 80 also comprises a cushion 84 movable within a cavity 82. In FIG. 11, these parts are illustrated by broken lines, since they are comprised within the second body part 80. When the cushion 84 is moved in the direction 96, it will protrude from the table surface 81 and eventually bend the tip part 94 of the closing tab 92.

Figure 12:
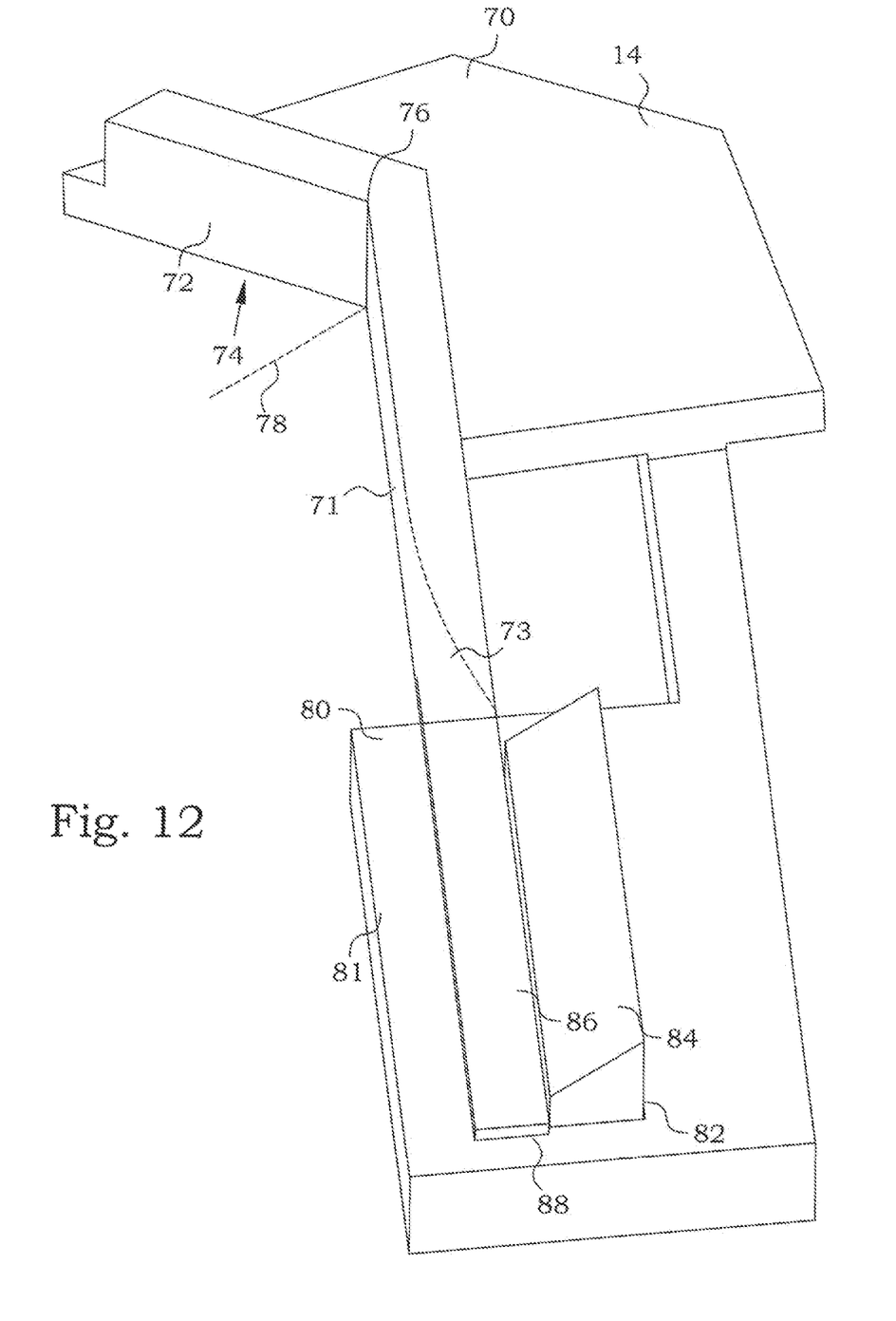
FIG. 12 illustrates the embodiment of FIG. 8 when the cushion protrudes from the table surface.

The sealing tool 14, with the protruding cushion 84 is illustrated in FIG. 12.

Figure 13:
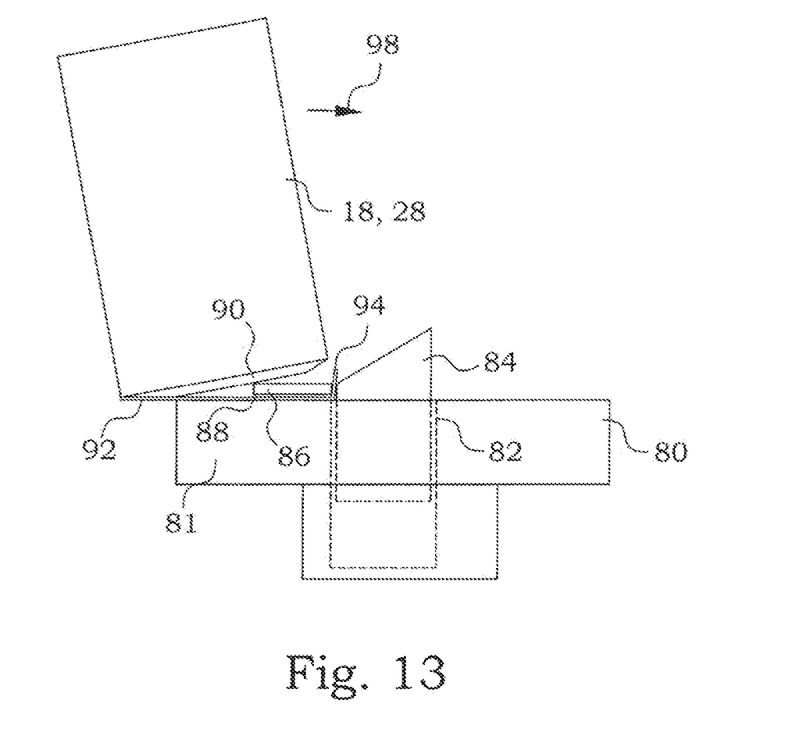
FIG. 13 illustrates the embodiment of FIG. 8 in a side view in another situation during a carton folding.

FIG. 13 illustrates a side view of the second body part 80, when the cushion 84 is protruding. The tip part 94 is bend and can be fitted into the carton 18, 28 by tilting the carton 18, 28 further in the direction 98. When the tip part 94 is fitted into the carton 18, 28, the carton 18, 28 is moved, towards the view as illustrated, to be released from the beam 86. The carton is thereby sealed.

In other words, operating on a carton having two side tabs and at least one closing tab, the sealing tool has a second body part having a beam 86 separated from a table surface 81 by a slit 88, and a cushion 84 movable within a cavity 82 in a direction perpendicular to the table surface 81. The edge of the cushion 84 is moved in a plane in a vicinity of an edge of the beam 86, whereby a closing tab 92 inserted into the slit 88 and protruding outside the edge of the beam 86 is bent by the motion of the cushion 84.

This procedure and tool can, as indicated, be used both at the entering section for folding a first end of the carton, as well as at the exit section to close the second end of the carton. The tool can be positioned in any direction. In FIG. 2, it is indicated that the tool is provided in a horizontal direction, while in FIG. 4, the tool is provided in a vertical direction in order not to risk that the objects loaded into the carton will fall out.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A cartoner, comprising:
an entrance section;
a loading section;
an exit section;
a transport system connecting said entrance section to said loading section, and said loading section to said exit section, respectively; and
a controller;
said entrance section being configured for picking carton blanks from a magazine;
said loading section being configured for loading a product into a carton made from one of the carton blanks;
said exit section being configured for closing a side of the loaded carton;
said transport system comprising a rail and carriers running along said rail;
said controller being arranged for controlling said transport system;
said controller being further arranged for adapting, for each carton, a distance between two consecutive carriers of said transport system in dependence of a size of said carton;
at least one of the entrance section or the exit section comprising a carton sealing tool capable of sealing a multitude of carton sizes;
said at least one of the entrance section or the exit section comprising a robot arranged for moving said carton along a predetermined path relative to said carton sealing tool;
said carton sealing tool having a geometrical shape that folds tabs of said carton;
said entrance section being further configured for folding a first side of the carton to form a first-side-folded carton;
said loading section being configured for loading the product into said first-side-folded carton;
said transport system being configured for transporting said first-side-folded carton from said entrance section to said loading section and transporting said loaded carton from said loading section to said exit section;
said side of the loaded carton that is closed by said exit section being a second side which is opposite to said first side;
said controller being arranged for further controlling an operation of said entrance section, said loading section, and said exit section, thereby following each carton through said cartoner;
said controller being further arranged for driving said two consecutive carriers along said rail while maintaining said distance; and
said controller being further arranged to control said entrance section and/or said loading section to place said first-side-folded carton and/or said loaded carton, respectively, between said two consecutive carriers.

2. The cartoner according to claim 1, wherein said controller is arranged to control said entrance section to place said first-side-folded carton between two consecutive carriers and to control said loading section to place said loaded carton between said two consecutive carriers and/or to perform a loading of said first-side-folded carton placed between said two consecutive carriers.

3. The cartoner according to claim 1, wherein said transport system comprises one rail for carton transport between the entrance section and the loading section and another rail for carton transport between the loading section and the exit section.

4. The cartoner according to claim 1, wherein said transport system comprises one common rail for carton transport both between the entrance section and the loading section and between the loading section and the exit section.

5. The cartoner according to claim 1, wherein:
said entrance section comprises a plurality of magazines for said carton blanks; and
said controller is arranged to pick, for each carton made from one of the carton blanks, said one of the carton blank from a particular one of said plurality of magazines.

6. The cartoner according to claim 1, wherein said controller is further arranged for controlling said loading section to load appropriate content adapted to a carton size of each individual carton.

7. The cartoner according to claim 1, wherein cartons made from said carton blanks are cartons having two side tabs and at least one closing tab;
wherein said carton sealing tool has a first body part having a first concavely V-shaped edge and a surface perpendicular to said concavely V-shaped edge; and
wherein a carton, when being moved towards said concavely V-shaped edge with said at least one closing tab in a direction along said surface and with said side tabs interacting with said concavely V-shaped edge with a center of said carton aligned with a bottom of said concavely V-shaped edge, is caused to fold said side tabs inward.

8. The cartoner according to claim 1, wherein cartons made from said carton blanks are cartons having two side tabs and at least one closing tab;
wherein said carton sealing tool has a first body part having a beam separated from a table surface by a slit, and a cushion movable within a cavity in a direction perpendicular to said table surface;
wherein an edge of said cushion is moved in a plane in a vicinity of an edge of said beam; and
wherein a closing tab inserted into said slit and protruding outside said edge of said beam is bent by said movement of said cushion.

* * * * *